Inventor:
Otto H. Hartmann
By Conway P Coe
Attorney

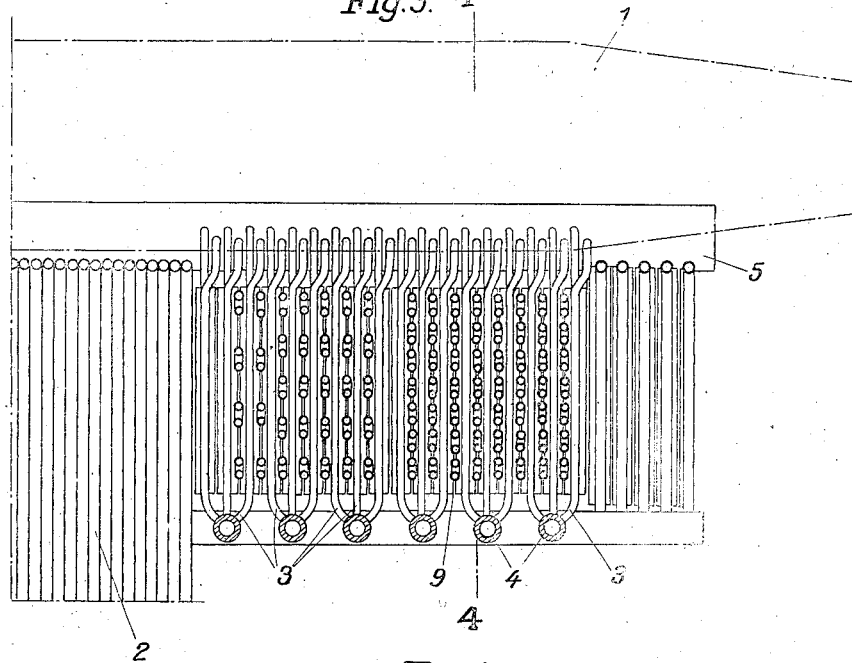
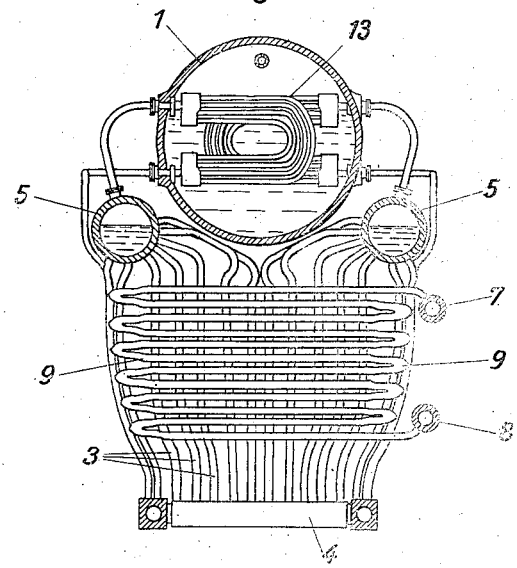

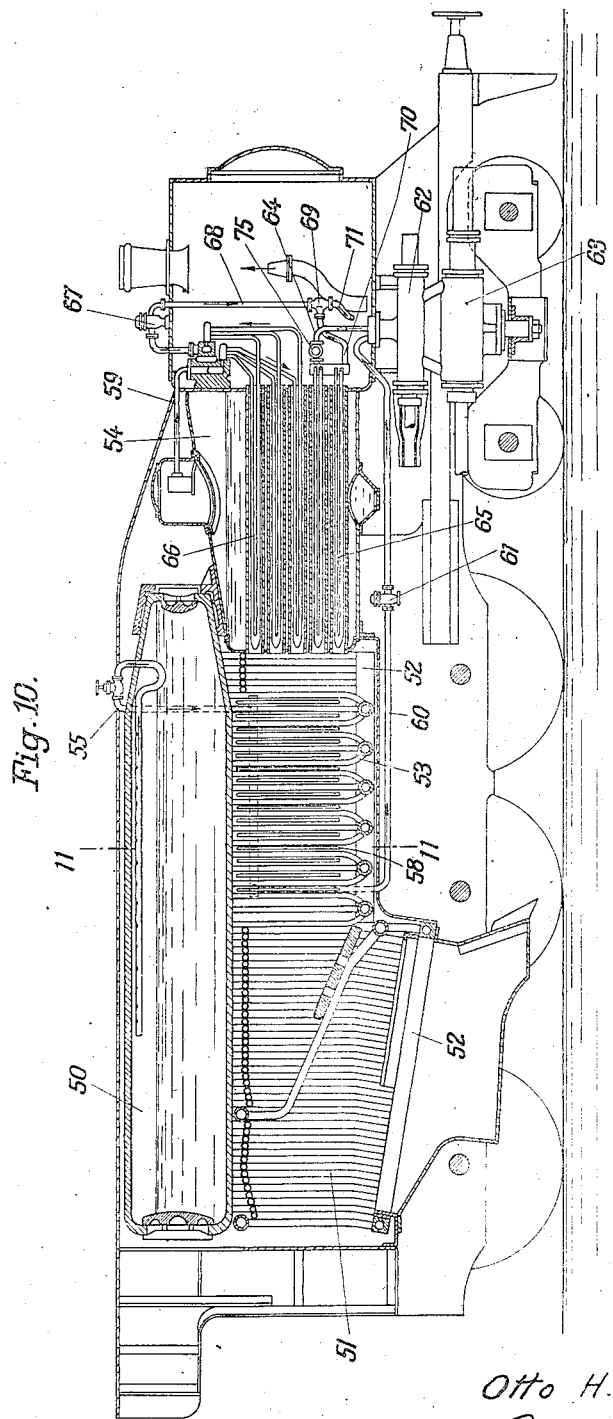

June 24, 1930.   O. H. HARTMANN   1,768,319
SUPERHEATING IN HIGH PRESSURE LOCOMOTIVES
Filed Oct. 27, 1928    7 Sheets-Sheet 6
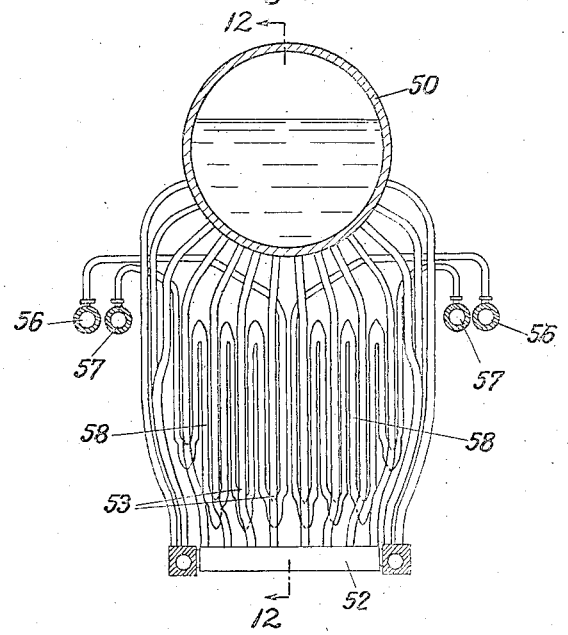
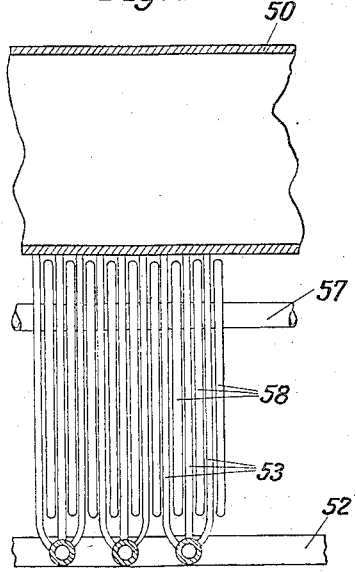
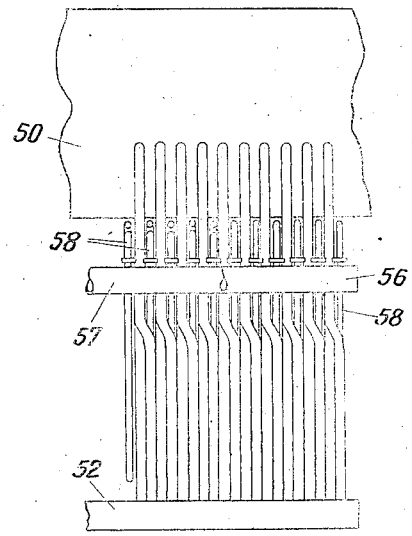
Inventor:
Otto H. Hartmann
By Conway P Coe
Attorney June 24, 1930.   O. H. HARTMANN   1,768,319
SUPERHEATING IN HIGH PRESSURE LOCOMOTIVES
Filed Oct. 27, 1928   7 Sheets-Sheet 7

Inventor:
Otto H. Hartmann
By Conway P Coe
Attorney

Patented June 24, 1930

1,768,319

UNITED STATES PATENT OFFICE

OTTO H. HARTMANN, OF CASSEL-WILHELMSHOHE, GERMANY, ASSIGNOR TO SCHMIDT'-SCHE HEISSDAMPF-GESELLSCHAFT M. B. H., OF CASSEL-WILHELMSHOHE, GERMANY, A CORPORATION OF GERMANY

SUPERHEATING IN HIGH-PRESSURE LOCOMOTIVES

Application filed October 27, 1928, Serial No. 315,557, and in Germany August 1, 1928.

My invention relates to superheating apparatus for high-pressure locomotives in which the working steam is generated by either the indirect or the direct process.

In high-pressure locomotives of this kind built as two-pressure locomotives, with a water-tube boiler generating heating steam in the case of indirect steam generation and high-pressure working steam in the case of direct steam generation, followed by the usual smoke-tube boiler serving as a low-pressure boiler and receiving the furnace gases from the high-pressure boiler, an advantageous solution of the superheating problem is readily obtainable, inasmuch as the smoke tubes of the longitudinal boiler can accommodate the tube elements of the usual smoke-tube superheater both for the high-pressure and also for the low-pressure sections of the boiler.

If, however, in such a two-pressure locomotive, it is desired to increase the proportion of high-pressure steam to such an extent that the low-pressure boiler generates only a small quantity of low-pressure steam (in certain circumstances so small a quantity that at low and moderate loads the low-pressure boiler serves chiefly or even solely as a feed-water heater, so that in the latter case the locomotive works with only high-pressure steam) the opportunity mentioned above of obtaining a favourable solution of the superheating problem does not occur.

A known and approximate solution is then to interpose the superheater and/or pre-superheater and re-superheater in the furnace flue between the steam-generating and the feed-heater sections of the boiler. Such an arrangement, however, has the essential disadvantage that, especially at low loads, an insufficient superheat is obtained, since the steam-generating section of the boiler has reduced the hot gases to too low a temperature before they reach the superheater.

A higher superheat can be obtained by arranging the superheater nearer the furnace, i. e., not behind but among the groups of steam-generating tubes, but with this arrangement there is a considerable danger, especially when steam is suddenly shut off and the engine stopped, that the superheater tubes will become red hot and in time burn through.

According to the present invention, the difficulty is overcome by arranging the tube elements of one or more superheaters, (pre-superheaters or re-superheaters) so that the lengths of superheater tube pass between or interleave the series of steam-generating tubes in transverse planes, that is, in planes transverse to the direction of flow of the hot gases.

With such an arrangement, a high degree of superheat is obtained since the superheater tubes lie in a hot zone of the furnace gases while at the same time these tubes are protected from burning through on suddenly shutting off steam.

With the steam-generating tubes and the steam-superheating tubes packed together in this way, a mutual reaction of the two sets of tubes occurs which is not present if the superheater is interposed as a whole either between the steam-generating section and the feed-heater section, or between two groups of tubes of the steam-generating section.

If the superheater is shut off, and in consequence the temperature of the tube walls rises, then according to the present invention, sufficient heat is withdrawn by adjacent steam-generating tubes absorbing heat radiated from the superheater tubes to prevent the latter becoming red hot and burning through.

It is not essential, that a superheater element always alternates with a series of steam-generating tubes; if desired, for example, a pair of superheater elements may alternate with two series of evaporating tubes.

In this way, it is possible to arrange the superheater elements closer to the combustion chamber without danger of the superheater becoming red hot and burning through when the locomotive stops or when there is suddenly no demand for steam, as for example when going downhill.

With the superheater arrangement according to the present invention, transmission of heat and the turbulence of the hot gases are improved, so that the superheater heating surfaces can be made correspondingly small and light and the important advantage secured of keeping down the weight of the locomotive for a given power. In addition, the superheater elements can be easily withdrawn and a comparatively uniform degree of superheating is obtained at all loads without the necessity of providing adjustable bypasses or similar devices.

The superheating tubes may run either across the evaporating tubes or parallel to them. In the first case the superheater elements, which preferably take the form of individual serpentines, can be withdrawn laterally, and in the second case, either upwards or downwards.

Further, the direction of flow of the steam through the superheater elements may be the same as, or opposite or transverse to that of the flue gases.

In order to avoid an obstruction in the intervals between the steam-generating water tubes and the superheater tubes, the straight lengths of the serpentines lying next to the furnace are preferably at a greater distance apart than the lengths of the serpentines lying further from the furnace (see Fig. 1 or 3), so that the ashes can separate and fall down into the space below, from which they are easily removed.

The boiler itself is provided with an enclosing wall, constructed either out of smooth tubes lying close to one another through which water flows or out of ribbed tubes so that radiation losses may be reduced as far as possible and the wall surfaces operate in a known manner as evaporating heating surfaces.

The construction of the enclosing wall from ribbed tubes at the same time makes it possible to provide a convenient support by resting the serpentine bends of the superheater elements on the one side in notches in the tube ribs and on the opposite side where they are withdrawable on removable plates serving both to support the serpentines and to maintain the continuity of the enclosing walls.

The invention is applicable not only to live steam superheaters but also to interstage superheaters and to superheaters built as pre-superheaters or re-superheaters, especially when the interstage superheating of the working steam is effected according to the indirect method by highly superheated live steam.

In all cases it is an essential feature of the invention that the lengths of superheater tube pass among the steam-generating tubes in transverse planes.

Certain arrangements of superheaters according to the present invention are shown by way of example in the accompanying drawings:—

Figure 3 shows to a larger scale that part of the high-pressure boiler containing the superheater, the working steam drum being indicated in chain-dotted lines;

Figure 4 shows likewise to a larger scale a cross-section on the line 4—4 of Figure 3;

Figure 14:
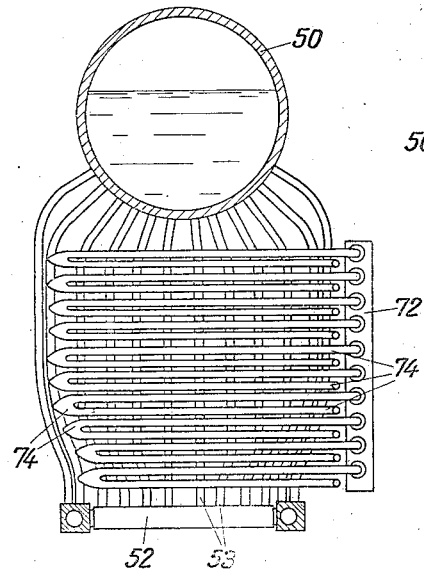
Figure 15:
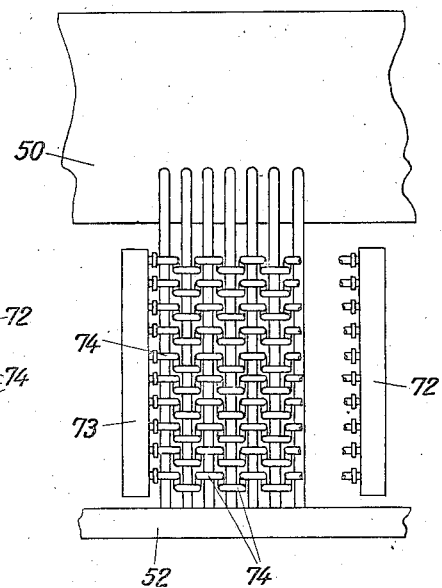
Figure 17:
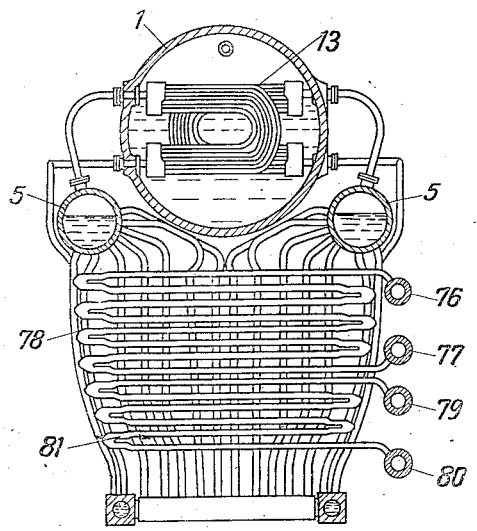
Figure 16:
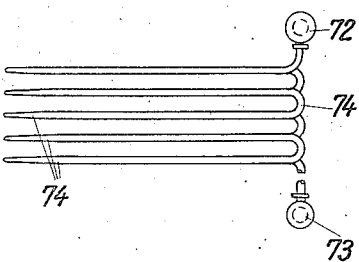

Figure 10 shows a longitudinal section through a high-pressure locomotive with direct generation of the high-pressure steam and a modified arrangement of interstage superheater, Figure 11 being a section on the line 11—11 of Figure 10, Figures 12 and 13 respectively a section on the line 12—12 of Figure 11 and an elevation of the superheater and of a part of the boiler broken away;

Figures 14, 15 and 16 show a modified form of superheater,

Figure 14 being a cross-section through the high-pressure boiler with the superheater in elevation, Figure 15 a side view of Figure 14, and Figure 16 a view from above of a part of a superheater serpentine; while finally Figure 17 shows a cross-section corresponding to Figure 4 of another modification of the invention.

In Figures 1 to 4, the high-pressure section of the locomotive consists of a heating system for the working steam drum, 1, in which high-pressure steam, for example, of 60 atmospheres pressure, is generated indirectly by means of steam at a still higher pressure, for example, 80 to 90 atmospheres or even by the vapour of a fluid having a high boiling point.

The heating boiler is formed of the fire box and the flue connected thereto and consists of evaporating tubes, 2, which form a continuous wall and crown for the fire box and flue. The part of the flue adjacent to the fire box is traversed by transverse series of upright evaporating tubes, 3, connected below to water headers, 4, and above, as seen in Figure 4, to intermediate containers, 5, in which the generated heating steam collects before it enters the heating elements, 13, lying in the water space of the working steam drum. From this drum, the working steam passes, for example, at a pressure of 60 atmospheres, through the pipe, 6, into a superheater which consists of the saturated steam header, 7, and the superheated steam header, 8, to which the superheater serpentines, 9, are connected, these serpentines, as seen from the drawings, passing in transverse planes between the series of upright evaporating tubes, 3.

The high-pressure steam, highly superheated in this superheater, 7, 8, 9, passes through the pipe 10, into the heater, 11, of the interstage superheater, 12, and after giving up its superheat to the high-pressure cylinder exhaust flowing through this interstage superheater, continues through the pipe, 14, to a second superheater or re-superheater which similarly to the first superheater consists of steam headers, 7 and 8, and serpentines, 9 lying in transverse planes between the series of upright evaporating tubes, 3. From this re-superheater, the high-pressure steam flows through the pipe, 15, by way of the regulating valve, 16, into the valve chest, 18, of the high-pressure cylinder, 19, of the engine. The exhaust steam from this high-pressure cylinder flows through the pipe, 20, preferably by way of the non-return valve, 27, into the interstage superheater, 12, and thence by way of the valve, 21, into the valve chest, 23, of each low-pressure cylinder, 24, of the engine. (See Figure 2.)

Between the smoke box, 17, and the flue formed by the tube walls, 2, a short smoke-tube boiler is operatively arranged, through which all the feed water passes and which serves primarily as a feed-water heater for the working drum, 1, of the high-pressure boiler. The low-pressure steam, for example of 14 atmospheres, generated in this boiler passes through the pipe, 28, likewise into the interstage superheater, 12, where it mixes with the exhaust from the high-pressure cylinder from the pipe, 20, and is superheated in conjunction therewith, the mixture passing by way of the regulating valve, 21, through the pipe, 22, into the valve chest of each low-pressure cylinder.

As seen from the drawing, the lengths of superheater tubes or serpentines, 9, lie in the part of the boiler containing the two superheaters in transverse planes between the series of evaporating tubes, 3, so that if for any reason no steam is passing through the superheater tubes, the latter, without becoming red hot, can radiate back the heat absorbed from the furnace gases to the adjacent series of evaporating tubes cooled from within by water or a mixture of water and steam. In this way it is possible to arrange the superheater serpentines closer to the fire box, and to utilize the very hot furnace gases in conjunction with a comparatively small superheating surface to obtain a high degree of superheat without danger of burning the superheater.

Figure 1:
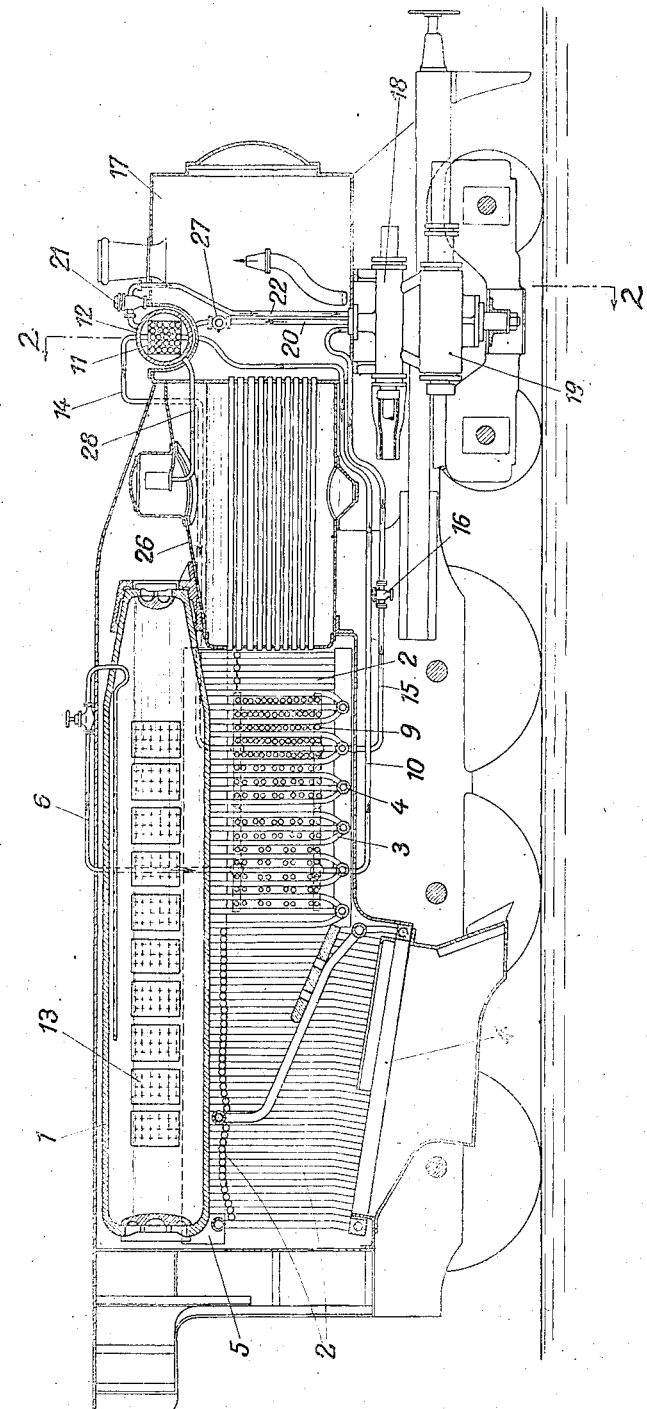
Figure 1 is a longitudinal section through a high-pressure locomotive in which high-pressure steam is generated indirectly on a well-known and preferred system, Figure 2 being a cross-section on the line 2—2 of Figure 1 through the interstage superheater and the smoke box.
Figure 2:
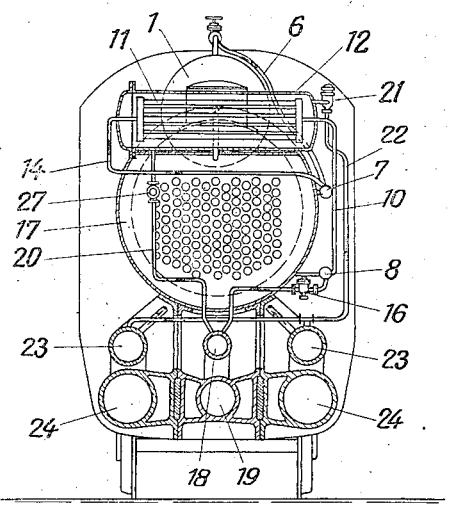
Figure 5:
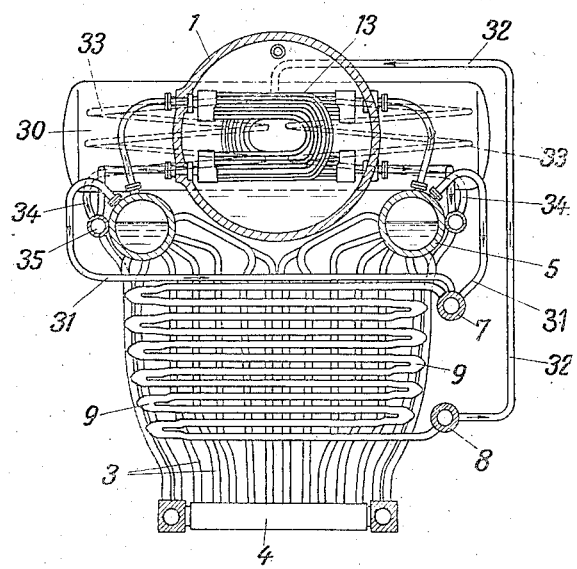
Figure 5 shows a cross-section corresponding to Figure 4 of a modification of the invention as seen from behind looking on the interstage superheater.
Figure 6:
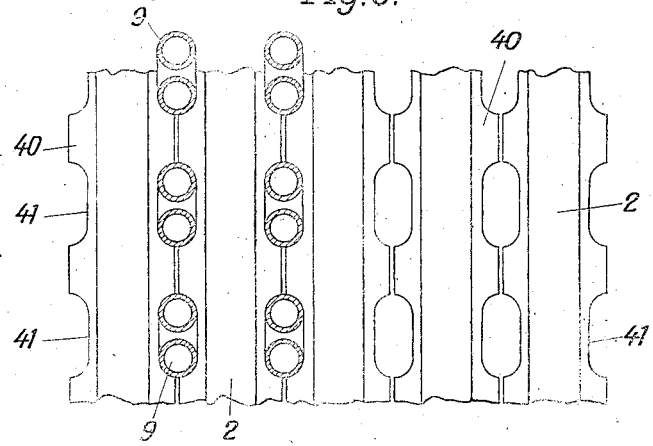
Figures 6 to 9 show corresponding views of methods of supporting the superheater serpentines, Figures 6 and 7 showing an elevation and plan as seen from behind, and Figures 8 and 9 elevation and plan of the front side on which the superheater serpentines can be withdrawn.
Figure 7:
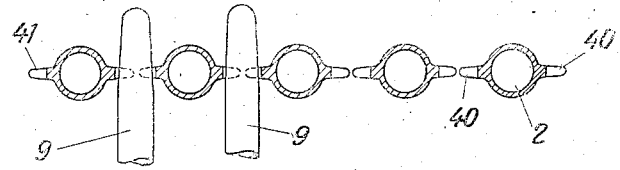
Figure 8:
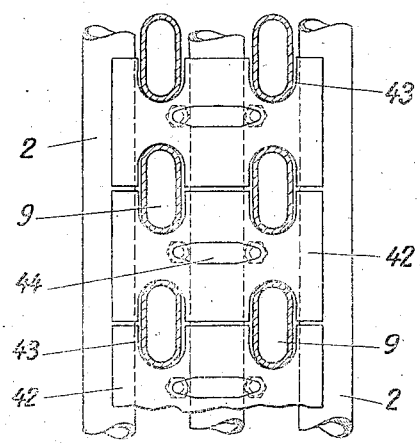
Figure 9:
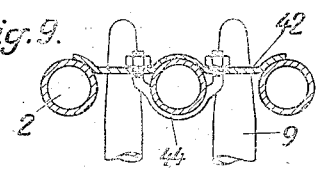

Figure 5 shows a form of the invention which differs from that shown in Figures 1 to 4 inasmuch as the heating steam for the interstage superheater, 30, corresponding to the interstage superheater, 12, of Figure 1, is taken from the intermediate containers, 5. Steam passes from these through the pipes, 31, into the saturated steam header, 7, of the superheater, 9, and after passing through the latter flows from the superheated steam header, 8, through the pipe, 32, to the heating serpentines, 33, of the interstage superheater, 30. After giving up its superheat and its heat of evaporation, the condensate flows through downcomer pipes, 34, into the collector headers, 35, which also receive the condensate from the heating elements, 13, of the working steam drum, 1. In this case, therefore, the part of the boiler embodying the superheaters does not, as in Figures 1 to 4, embody a superheater and a re-superheater for the high-pressure working steam, but a superheater for the high-pressure working steam and a superheater interposed in a branch of the closed circulating heating system of the high-pressure boiler.

According to a modification of the form shown in Figure 5, the heating steam may be led from the intermediate containers, 5, direct without previous superheating into the heating serpentines, 33, of the interstage superheater. In this case the boiler section contains only one superheater for the high-pressure working steam between the series of evaporating tubes, 3.

Figures 6 to 9 illustrate a method of supporting the superheating serpentines, 9.

To afford the necessary support, the evaporating tubes, 2, forming the boundary wall on one side of the furnace flue are provided with ribs, 40, having notches, 41, into which the bends of the superheater serpentines, 9, fit. On the opposite side, i. e., the side on which the superheater elements can be withdrawn, the corresponding tubes, 2, are formed without the ribs and the superheater elements are held in place by clamping plates, 42, likewise provided with notches for the bends of the superheater serpentine, 9, these plates, 42, being fixed to the individual tubes, such as 2, by screwed yokes, 44, secured by nuts.

In the locomotive shown in Figure 10, the high-pressure working steam is generated by the direct method at a pressure for example for 60 atmospheres in a water-tube boiler which consists of the steam-and-water drum, 50, and the water tubes, 51, which also in this case form the walls and crown of the fire box and are connected together below by water headers, 52.

The part of the flue connected to the fire box is traversed by a series of vertical evaporating tubes, 53.

To the water-tube boiler is operatively connected the short low-pressure boiler, 54, which serves primarily as a feed-water heater for the high-pressure boiler but at the same time generates low-pressure steam, for example, at 14 atmospheres pressure.

In the example shown the superheating is effected as follows:—

The high-pressure steam generated in the steam-and-water drum, 50, flows through the pipe, 55, into a superheater which is divided into two valves (see Figure 11) with saturated-steam headers, 56, and superheated steam headers, 57, to which the superheater serpentines, 58, are connected. In this case, the lengths of superheater tube run parallel to the series of upright evaporating tubes, 53, from the upper parts of which they are suspended. Further, the superheater serpentines pass between the series of evaporating tubes, 53, in transverse planes as in the example of the invention shown in Figures 1 to 5. The superheated high-pressure steam passes through the pipe, 60, by way of the valve, 61, into the valve chest, 62, of the high-pressure cylinder, 63.

In order to effect the interstage superheating of the exhaust steam from the high-pressure cylinder and also the superheating of the live steam generated in the low-pressure boiler, a superheater of the well-known smoke-tube type is provided. The exhaust from the high-pressure cylinder passes through the pipe, 64, preferably by way of the non-return valve, 75, into the saturated steam header of the smoke tube superheater, 65. The low-pressure steam generated in the low-pressure boiler, 54, flows through the pipe, 59, into the saturated-steam header of the second smoke-tube superheater, 66, and after being superheated therein passes from the superheated-steam header of this superheater by way of the valve, 67, and a pipe, 68, into the mixing chamber, 69, into which also flows the superheated high-pressure cylinder exhaust steam from the superheater, 65, through the pipe, 70. From the chamber, 69, the superheated mixture flows through the pipe, 71, (shown broken off in Figure 10) into the valve chests of the low-pressure cylinders which are arranged in the same way as in Figure 2.

A modified arrangement of the superheater tubes is shown in Figures 14, 15 and 16.

In this form, the superheater or superheaters, as in the example of the invention shown in Figures 1 to 4, can be withdrawn laterally, the saturated steam headers, 72, and the superheated steam headers, 73, being arranged vertically. The ends of the superheater serpentines, 74, connected to these headers, as seen in Figure 16, are bent through 90° so that the serpentines, 74, again pass among the series of upright evaporating tubes, 53, in transverse planes, the same advantages being in this way secured as in other constructional forms of the invention.

Figure 17 shows as a cross-section corresponding to that of Figure 4, a modification of the superheating arrangements when two superheaters are built in between the upright evaporating tubes, 3, the two superheaters lying in the flue, not in series, but in parallel and one above the other so that both are heated to the same extent. The steam headers, 76, and 77, with their serpentines, 78, constitute for example the pre-superheater while the steam headers, 79 and 80, with their serpentines, 81, constitute the re-superheater.

It is obvious that the superheater constructions shown in Figures 11 to 13 and 14 to 16 may also be applied to a high-pressure locomotive generating high-pressure steam by the indirect method as in Figure 1, and conversely, the superheater constructions described and shown in this locomotive according to Figures 3, 4 and 17, may also be applied to a locomotive as in Figure 10, generating steam by the direct method.

The superheater constructions and connections therefor are equally applicable to locomotives having two high-pressure cylinders instead of one.

What I claim is:

1. In a high-pressure locomotive the combination of a high-pressure-water-tube boiler, a low-pressure-smoke-tube boiler receiving the furnace flue gases from the high-pressure boiler, at least one superheater to superheat the high-pressure steam, and at least one superheater to superheat the low-pressure steam, the high-pressure boiler having a series of steam generating water tubes crossing the channel of flue gases and the lengths of the high-pressure superheater tubes passing between the said series of steam generating water tubes in planes transverse to the direction of flow of the flue gases.

2. In a high-pressure locomotive the combination of a high-pressure-water-tube boiler, a low-pressure-smoke tube boiler receiving the furnace flue gases from the high-pressure boiler, at least one superheater to superheat the high-pressure steam and at least one superheater to superheat the low pressure steam, the high-pressure boiler having series of steam generating water tubes crossing the channel of flue gases, the high-pressure superheater tubes consisting of removable individual serpentines the lengths of which pass between the said series of steam generating water tubes in planes transverse to the direction of flow of the flue gases.

3. In a high-pressure locomotive the combination of a high-pressure-water-tube boiler, a low-pressure-smoke-tube boiler receiving the furnace flue gases from the high-pressure boiler, at least one superheater to superheat the high-pressure steam and at least one superheater to superheat the low-pressure steam, the high-pressure boiler having series of steam generating water tubes crossing the channel of flue gases, the high-pressure superheater tubes consisting of removable individual serpentines the lengths of which pass between the said series of steam generating water tubes in planes transverse to the direction of flow of the flue gases and the vertical spaces between the lengths of the individual serpentines situated closer to the furnace being greater than the vertical spaces between the lengths of the individual serpentines situated further from the furnace.

4. In a high-pressure locomotive the combination of a high-pressure-water-tube boiler, a low-pressure-smoke-tube boiler receiving the furnace flue gases from the high-pressure boiler, a superheater to superheat the high-pressure steam, an interstage superheater heated by the high-pressure steam to superheat the exhaust steam of the high-pressure stage of the locomotive engine, a superheater to reheat the high-pressure steam, the two high-pressure steam superheaters consisting of removable individual serpentines the lengths of which passing between series of steam generating water tubes of the high-pressure boiler in planes transverse to the direction of flow of the flue gases.

5. In a high-pressure locomotive the combination of a high-pressure-water-tube boiler, a low-pressure-smoke-tube boiler receiving the furnace flue gases from the high-pressure boiler, a superheater to superheat the high-pressure steam, an interstage superheater heated by the high-pressure steam to superheat the exhaust steam of the high-pressure stage of the locomotive engine, a superheater to reheat the high-pressure steam, the two high-pressure steam superheaters consisting of removable individual serpentines the lengths of which passing between series of steam generating water tubes of the high-pressure boiler in planes transverse to the direction of flow of the flue gases and means to conduct live steam developed in the low-pressure-smoke-tube boiler into the said interstage superheater.

6. In a high-pressure locomotive the combination of a high-pressure-water-tube boiler, a low-pressure-smoke-tube boiler receiving the furnace flue gases from the high-pressure boiler, at least one superheater to superheat the high-pressure steam, at least one superheater to superheat the low-pressure steam, the high-pressure boiler having series of steam generating water tubes crossing the channel of flue gases, the high-pressure superheater tubes consisting of removable individual serpentines the lengths of which passing between the said series of steam generating water tubes in planes transverse to the direction of flow of the flue gases and water tubes of the high-pressure boiler forming closed walls of the flue gas channel, the said water tubes being provided in the region of the removable interleaving superheater serpentines with means to support the bends of said serpentines.

In testimony whereof I have affixed my signature.

OTTO H. HARTMANN.